Oct. 18, 1960     N. D. R. CALDER ET AL     2,957,044
OPTICAL SCANNING DEVICE

Filed Oct. 19, 1956     3 Sheets-Sheet 1

INVENTORS
NIGEL DAVID RITCHIE CALDER
PIETER SCHAGEN
CHRISTOPHER HALY TOSSWILL
BY
AGENT

United States Patent Office 2,957,044
Patented Oct. 18, 1960

2,957,044

OPTICAL SCANNING DEVICE

Nigel David Ritchie Calder, Crawley, Pieter Schagen, Salfords, near Redhill, and Christopher Haly Tosswill, Reigate, England, assignors, by mesne assignments, to North American Philips Company, Inc., New York, N.Y., a corporation of Delaware Filed Oct. 19, 1956, Ser. No. 616,981

Claims priority, application Great Britain Oct. 19, 1955

8 Claims. (Cl. 178—7.6)

This invention relates to scanning devices for displaying images, more especially images composed in accordance with a raster of parallel lines obtained by line and frame scans as, for example, in television display systems.

In televiison apparatus employing a rectangular raster it may in certain circumstances be desirable to effect the relatively slow frame scan by mechanical means in order to simplify other problems, and such circumstances may arise in the practical application of colour television due to the greater complexity of the display requirements.

It is an object of the present invention to provide an improved scanning device for displaying images.

A scanning device according to one aspect of the invention comprises in combination a rotatable carrier or support carrying a plurality of similar cylindrical or substantially cylindrical lenses which have the generatrices of their curved surfaces parallel to the axis of rotation of said carrier and which lenses are similarly disposed in relation to such axis, stationary cathode ray tube means within said carrier and within the paths of said lenses for producing a source of light of ponit or spot form animated by repetitive motion along a substantially or generally rectilinear path constituting a line scan on a stationary or approximately stationary path parallel to the axis of rotation of said carrier, and opaque masking means extending between adjacent lenses for preventing viewing of the line scan source except through one or other of said lenses.

The term "cylindrical lens" is used herein to denote a lens having a form defined by one or more curved surfaces generated by the motion of a rectilinear generatrix maintained at a constant orientation and having a cross-section normal to said generatrix comprising one or more curved lines which do not exhibit a mathematical point of inflection, or defined by such a curved surface and a plane surface parallel to the generatrix thereof. Such lenses are thus not restricted to having a circular or elliptical cross-section and may for example be double-convex or plano-convex. In one preferred example the cross-section of a lens is a complete circle thus giving the lens a rod form, which is convenient from a manufacturing point of view.

A scanning device according to a second aspect of the invention comprises in addition to the combination aforedescribed eccentric disposition of the line scan source within said carrier on the side of the axis remote from that part of the total lens path in which any given lens moves when it generates a travelling image to be viewed by an observer.

The image produced by the rotating carrier may be viewed in a mirror which may for example be conveniently arranged behind the carrier with respect to an observer's position. The mirror may advantageously take the form of a magnifying reflective surface. In those cases where the travelling image is viewed without the aid of a mirror positioned behind the carrier, including the case where the image is magnified by means of a lens positioned between the carrier and an observer's position, in a device according to the second aspect of the invention the line scan light source within the carrier will be eccentrically disposed within the carrier on th side of the axis remote from the viewing position or the observer. However, in the case where the image is viewed in a mirror located behind the carrier the eccentricity will be determined with respect to such mirror and the line scan source will be disposed eccentrically within the carrier on the side of the axis remote from the mirror. The effect of the eccentricity in all these cases is to produce a travelling image to be viewed by an observer which image has a curvature which is less than the curvature of the path of the lenses, and this advantageous property will be explained hereinafter.

When the invention is applied to the production of an image in a television display system the image is seen by viewing the light source through successive lenses and such a system, being a direct viewing system as opposed to a projection system, is advantageous over projection systems inasmuch as the apparent brightness of the individual lines is equal to the apparent brightness of the line source itself. The width of the line image seen will be smaller than the width of the source but gaps between the lines of the raster can be avoided by increasing the width of the source.

With a television display system as indicated above and employing a rectilinear light source, the number of lenses depends on the desired viewing angle and also on the position of the light source within the rotary lens carrier structure. Moreover, these parameters are also related to the cross-section of the lenses. Thus, to obtain a wide vertical viewing angle it is necessary to have lenses having a short focal length; lenses suitable from this point of view are right-cylindrical lenses having a circular cross-section, and in certain circumstances it may be desirable to reduce even further the focal distance by giving the lenses an elliptical cross-section having its major axis co-planar with the axis of rotation of the device. Such increase in the viewing angle allows reduction of the diameter of the lens path for a given picture height.

It is convenient, when the invention is applied to television, to arrange that the length of the cylindrical lenses exceeds the length of the line scan while the distance between adjacent lenses is equal or approximately equal to the length of the frame scan.

In the case of a tri-chrome colour television receiver the rectilinear light source may include means for displaying the necessary colour components as well as the variation of light intensity of the picture and this may be done by various known methods of colour display such as, for example, simultaneous or sequential line scanning of three adjacent strips of luminescent material adapted to luminesce in the basic colours, or dot sequentially. Alternatively, frame sequential display may be obtained with a black and white source by mounting a colour filter across each of the cylindrical lenses or by colouring said lenses so as to enable them to act as colour filters.

Preferred embodiments of the invention suitable for television receivers with vertical frame scan will now be described by way of example with reference to the accompanying diagrammatic drawings.

Figure 1:
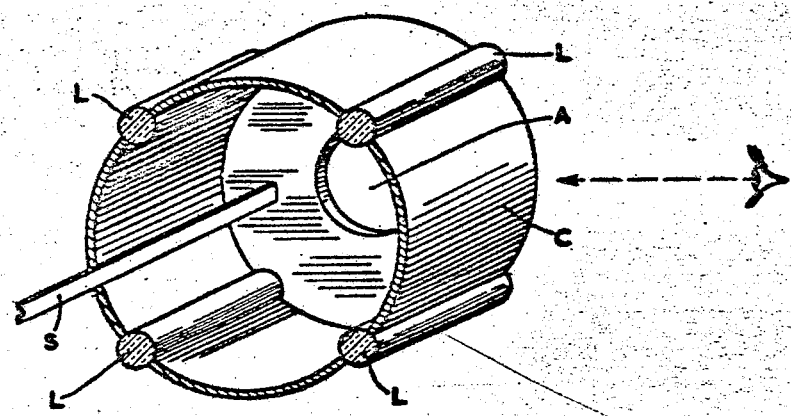
Figure 1 shows a part perspective view of a carrier drum carrying four cylindrical lenses.

Referring now to the drawings, Figure 1 is a part sectional perspective view of a simplified device comprising a horizontal light source S of strip form within an opaque rotary lens carrier C of cylindrical form in the wall of which are mounted four horizontal right cylindrical lenses L of rod form. An aperture A is provided in an end plate of the carrier to allow introduction of the light source and/or support therefor. The carrier is rotated at ¼ of the frame frequency, and the source S is viewed through each lens in succession from a direction to the right of the figure. The opaque wall of the carrier acts as a mask for preventing direct viewing of the light source S. The source S is a travelling point source rather than a line source and includes means (not shown) for effecting a relatively fast horizontal scan, with modulation, corresponding to the normal television line scan, the lenses effecting the relatively slow frame scan.

Figure 2:
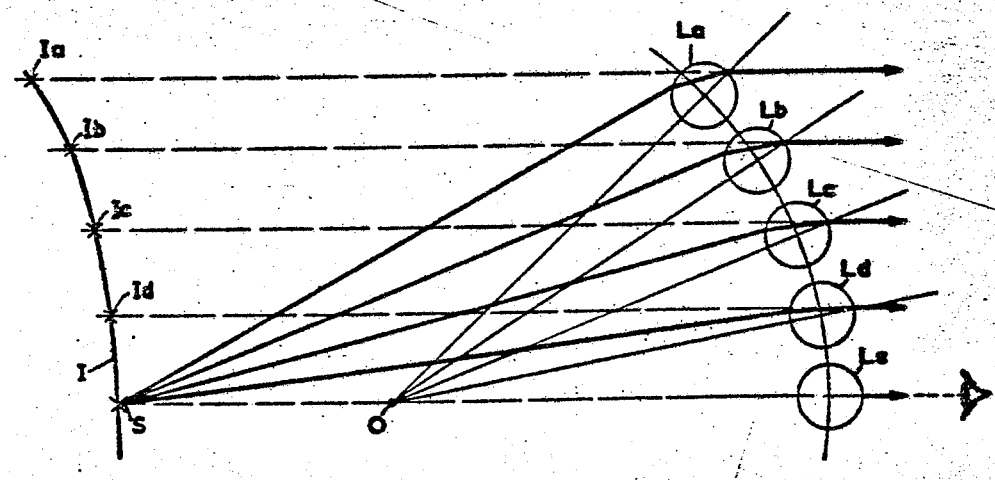
Figure 2 illustrates the formation and position of the image produced on the rotation of such a drum.

Figure 2 shows successive positions La ... Le of a rod lens L having its axis moved on a circular path with centre O, Le being the central position. If the light source were located on the axis of rotation O, the picture viewed from a position to the right of the figure in the horizontal plane through axis O would appear distorted to a cylindrical form of corresponding curvature. However, if the light source is located behind the axis O, e.g. in the position S shown, the image seen from a position to the right of the figure in the horizontal plane OS has a much smaller degree of curvature; this is indicated by curve I which applies to a viewing position at infinity along OS as chosen for convenience of representation. Such correction is due to the varying distance between the light source S and the lens L. At each position of the lens, the image Ia ... Ie of the source will appear at a distance beyond the lens which is equal to the distance between the source and the lens. In the arrangement shown, this distance varies and is shortest at the top and bottom of the operative scanning motion of the lens where the lens is farthest from the eye; thus in position La of the lens, the distance Sla=La Ia is shorter than the distance Sld=Ld Id corresponding to the more central position Ld of the lens.

It has been found in practice that satisfactory correction of the curvature of the picture can be obtained without displacing the source S as far back as the maximum allowed by the return motion of the lenses, and it is desirable not to displace said source more than is necessary since otherwise the length of the lenses must be increased if the same horizontal viewing angle is to be maintained.

Figure 3:
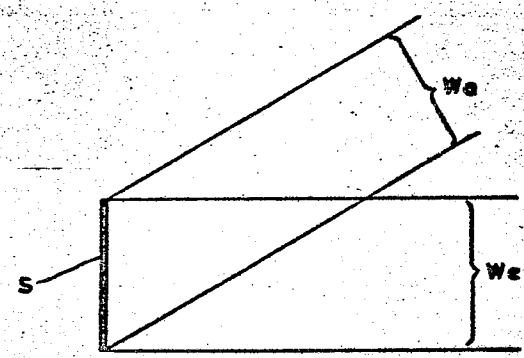
Figure 3 illustrates a distortional effect of this image.

A further distortion arises due to use of a light source of finite width. This is illustrated in Figure 3 from which it can be seen that the width of the projection of the source (shown in cross-section at S) varies with lens position due to foreshortening, so that the image of the source S appears wider at the centre (We) of the picture than at the upper edge (Wa) or lower edge. This effect can be corrected by giving an appropriately non-circular cross-section to the lenses, e.g. an elliptical cross-section with its major axis passing through the axis of rotation. However, if the source S comprises three parallel colour strips on a curved wall or support, a further colour-shift distortion arises due to differential foreshortening.

Figure 4:
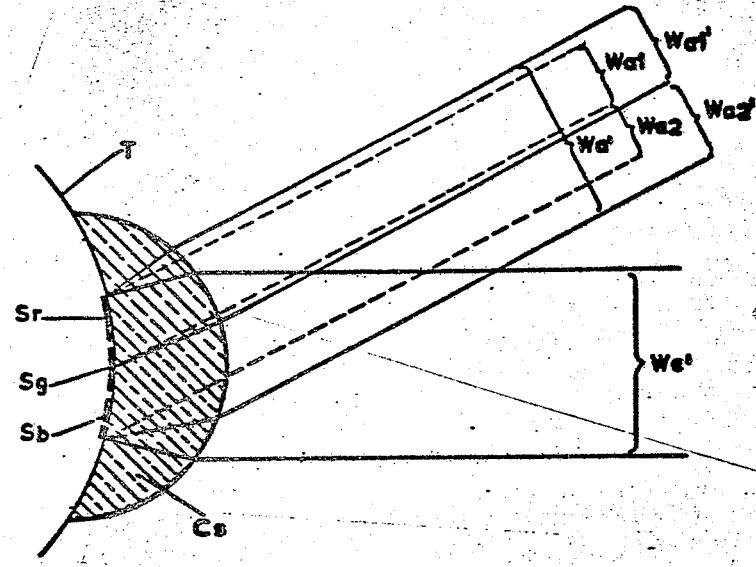
Figure 4 shows means for correcting for such effect.

In the latter event, a single method of correction may be used for both types of foreshortening distortion as shown in Figure 4. If a source comprising, say, red, green and blue parallel phosphor strips Sr, Sg, Sb is disposed on a curved or tubular wall T, there will be as aforementioned a narrow over-all image when a lens is at an extreme position of the scan so that an individual line will appear thinner at its extreme positions than at the centre of the image. Moreover, the individual strips are foreshortened to unequal extents as is seen by comparing uncorrected projections Wa1 and Wa2; thus there will be a colour shift from top to bottom of the picture, with a predominance of red at the top and blue at the bottom. Both these distortions may be reduced by the provision of a cylindrical correcting lens Cs which, as shown in the drawing, increases the total image width at the upper and lower positions to an extent greater than the increase in the horizontal position of a scanning lens (this is seen by comparing Wa' with We'), while at the same time the width of the image of the strip remote from the lens is increased in relation to that of the colour strip nearest to the lens (this is illustrated by the fact that the ratio of Wa1' and Wa2' is nearer to unity than the ratio of Wa1 and Wa2).

Figure 5:
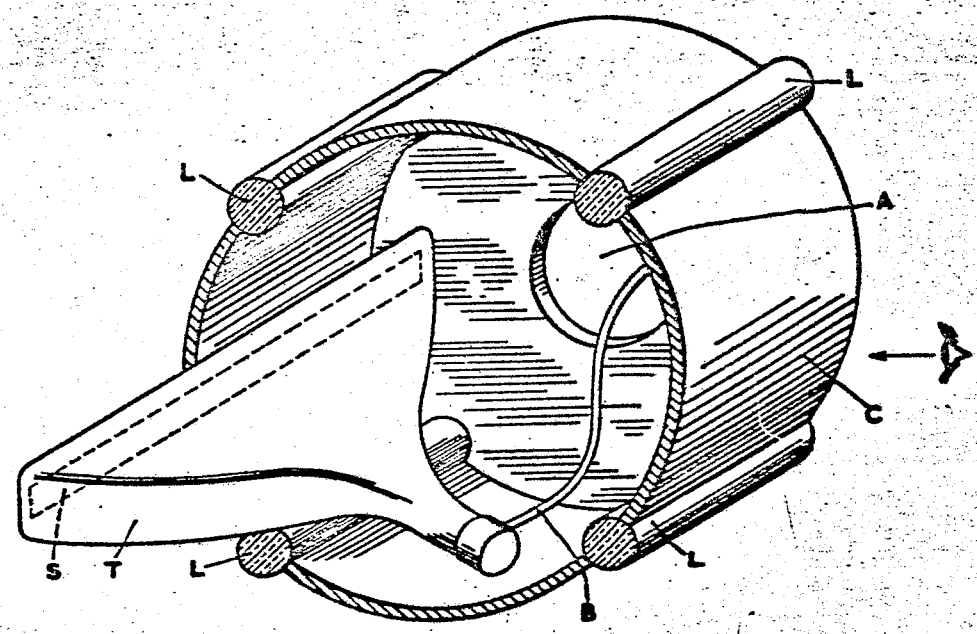
Figures 5 and 6 are a part perspective view and side view, respectively, of a carrier drum as shown in Figure 1 but wherein the line source is provided by the screen of a cathode ray tube.
Figure 6:
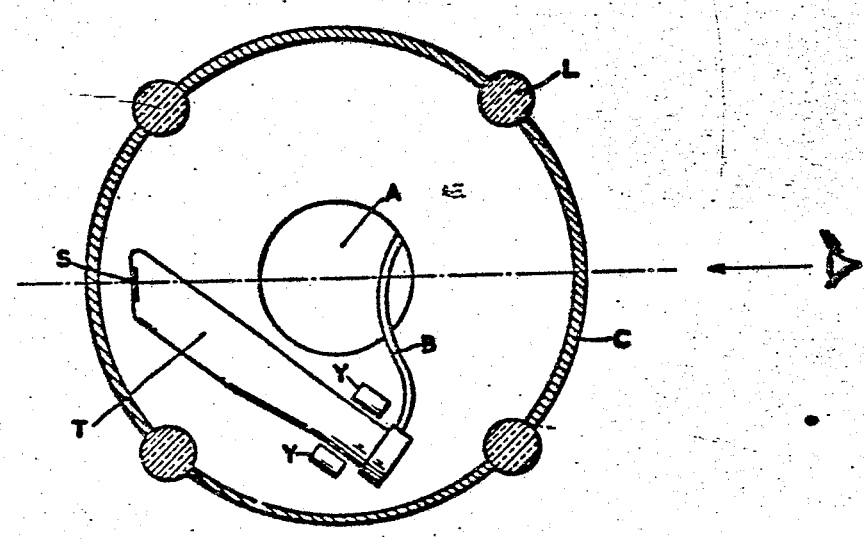

Figures 5 and 6 show one practical form of the invention in which the line source S is provided by a phosphor strip on the screen of a cathode ray tube (C.R.T.) T located within the lens carrier C. A convenient form of tube is one having an elongated rectangular screen as shown. By way of example various approximate dimensions of this C.R.T. and lens carrier drum system will now be given:

| | |
|---|---|
| Diameter of drum | cms 44 |
| Diameter of each lens | cm 1 |
| Length of C.R.T. | cms 30 |
| Length of C.R.T. neck | cms 10 |
| Diameter of C.R.T. neck | cms 2.5 |
| Length of C.R.T. screen | cms 40 |

Deflection means for effecting the scanning of the beam of the tube are diagrammatically shown at Y. By employing the light source in the manner shown rather than utilising the light emerging from the face of the C.R.T. an advantageous light gain is derived. This is because in a normal C.R.T. the amount of light which is radiated inwardly, i.e. away from the glass face carrying the screen, is approximately double that which passes through this glass face. The support means (not shown) and the supply cable B for the tube T pass through the aperture A.

When the arrangement illustrated in Figures 5 and 6 is employed for the production of a tri-colour television picture image the line source S may be provided by three adjacent bands of luminescent material adapted to luminesce in the basic colours red, green and blue, each band being several millimetres wide. The scanning of the phosphor bands may be effected by three electron beams scanning the separate colour bands along substantially rectilinear paths or the scanning may be along generally rectilinear paths such as, for example, by scanning the three phosphor bands with a single electron beam which is spot-wobbled.

The colour trace should be formed accurately side by side, and, in combination, should provide the normal resolution of colour and intensity in the line direction. The effective height or thickness of each trace should be such as to produce a line of correct height in the picture image.

Although the traces in each band may be substantially stationary they are preferably only approximately so and preferably are deflected through a small auxiliary saw-tooth scan within the individual phosphor bands in synchronism with and at the frequency of the frame scanning, for example at 50 c./s. with a 405-line Standard; this auxiliary scan relieves the local loading on the phosphor, and may be used to improve the optical scanning.

The phosphors should have visible afterglows less than $100\mu$ sec. in duration, to avoid loss of resolution in the frame direction due to information displayed during previous line scans still being visible during the scan of subsequent lines as the frame-scan proceeds. They should withstand the high local loading and the temperatures generated by the repeating line scan. They should also emit the primary colours necessary for matching at adequate brightness.

Synchronisation of the rotating carrier with the input signals can be achieved by comparing the phase of a saw-tooth wave generated as the carrier rotates with the phase of the frame synchronising pulses. Any variation in phase may be employed to cause a corresponding change in the degree of saturation of a saturable reactor controlled device governing an induction motor driving the shaft of the carrier. The saw-tooth wave may be generated as a suitably shaped rotor on the shaft of the carrier passes between a coil-wound U-shaped stator.

What is claimed is:

1. An optical scanning device comprising a rotatable support, a plurality of spaced substantially cylindrical lenses mounted on said support and extending substantially parallel to each other and to the axis of rotation of said support, means comprising a phosphor strip fixedly mounted within the support and extending parallel to the said axis of rotation cooperating with a modulated electron beam for producing a scanning line extending substantially parallel to the said axis of rotation, and light-opaque means extending between the spaced lenses, said scanning line being viewable by an external observer along a line of view extending through said lenses, said phosphor strip being located between the axis and a point on the line of view more remote from the observer than the axis.

2. An optical scanning device comprising a rotatable support, a plurality of spaced substantially cylindrical lenses mounted on said support along a generally cylindrical surface coaxial with the axis of rotation of said support so as to extend substantially parallel to each other and to the said axis of rotation, a cathode ray type of electron device fixedly mounted within the support and comprising a phosphor strip extending parallel to the said axis of rotation cooperating with a modulated electron beam for producing a scanning line of light extending substantially parallel to but spaced from the said axis of rotation, said scanning line being viewable by an external observer along a line of view extending through said lenses, said phosphor strip being located at a point on the line of view, relative to the observer, beyond the axis, and light-opaque means extending between the spaced lenticular elements so as to prevent external observance of the line of light except through a lens.

3. A device as set forth in claim 2, wherein the cathode ray device has a screen constituted of plural, adjacent stripes of luminescent material luminescing in plural colors.

4. An optical scanning device comprising a hollow cylindrical rotatable support, a plurality of spaced substantially cylindrical straight rod-like lenses mounted on the surface of said support and extending substantially parallel to each other and concentric with the axis of rotation of said support, a cathode ray tube fixedly mounted within the support and comprising a phosphor strip extending parallel to the said axis of rotation cooperating with a modulated electron beam for producing a substantially stationary rectilinear scanning line of light extending substantially parallel to but spaced from the said axis of rotation, said scanning line being viewable by an external observer along a line of view extending through said lenses, said phosphor strip being located at a point on the line of view, relative to the observer, beyond the axis, and light-opaque means extending between the spaced lenses so as to prevent external observance of the line of light except through a lens.

5. A device as set forth in claim 4 wherein the lenses have a circular cross-section.

6. A device as set forth in claim 4 wherein the lenses have an elliptical cross-section.

7. A device as set forth in claim 4 for producing a televised image composed of a raster of parallel lines obtained by line and frame scansions, wherein the lenses have a length exceeding that of the line scan, and the lenses are spaced apart a distance approximately equal to the length of the frame scan.

8. A device as set forth in claim 4 wherein the total number of lenses is not less than three and not greater than four.

References Cited in the file of this patent

UNITED STATES PATENTS

| | | |
|---|---|---|
| 1,683,137 | Jenkins | Sept. 4, 1928 |
| 1,988,303 | Donle | Jan. 15, 1935 |
| 2,661,393 | Bell | Dec. 1, 1953 |
| 2,744,952 | Lawrence | May 8, 1956 |
| 2,848,533 | Burr | Aug. 19, 1958 |

UNITED STATES PATENT OFFICE
CERTIFICATION OF CORRECTION

October 18, 1960

Patent No. 2,957,044

Nigel David Ritchie Calder et al.

It is hereby certified that error appears in the above numbered patent requiring correction and that the said Letters Patent should read as corrected below.

Column 2, line 5, for "th side" read -- the side --; column 5, line 45, for "lenticular elements" read -- lenses --.

Signed and sealed this 4th day of July 1961.

(SEAL)
Attest:

ERNEST W. SWIDER
Attesting Officer

DAVID L. LADD
Commissioner of Patents